United States Patent [19]

Glover et al.

[11] Patent Number: 5,573,203
[45] Date of Patent: Nov. 12, 1996

[54] RELEASABLE ATTACHMENT FOR CONNECTING FILM STRIP TO A FILM CASSETTE

[75] Inventors: Edward C. Glover, London; Anthony Earle, Middlesex, both of England

[73] Assignee: Eastman Kodak Company, Rochester, N.Y.

[21] Appl. No.: 517,522

[22] Filed: Aug. 21, 1995

[30] Foreign Application Priority Data

Aug. 24, 1994 [GB] United Kingdom .................. 9417099

[51] Int. Cl.$^6$ ....................................... G03B 23/02
[52] U.S. Cl. ............................ 242/584.1; 242/348.1
[58] Field of Search .......................... 242/348, 348.1, 242/348.3, 584.1; 354/275

[56] References Cited

U.S. PATENT DOCUMENTS

| 3,586,258 | 6/1971 | Horlezeder . |
| 3,650,389 | 3/1972 | Mook . |
| 3,705,696 | 12/1972 | Edwards . |
| 4,334,750 | 6/1982 | Fichter . |
| 4,338,015 | 7/1982 | Holmes . |
| 4,808,229 | 2/1989 | Arhelger . |
| 4,834,310 | 5/1989 | Ikariya et al. . |
| 5,054,710 | 10/1991 | Ikariya et al. . |

FOREIGN PATENT DOCUMENTS

| 140089 | 2/1980 | German Dem. Rep. .............. 354/275 |
| 1285293 | 12/1968 | Germany ............................. 354/275 |
| 4-124653 | 4/1992 | Japan ................................. 242/584.1 |

Primary Examiner—John P. Darling
Attorney, Agent, or Firm—Clyde E. Bailey, Sr.

[57] ABSTRACT

Film cassettes normally include a spool on to which a film strip is wound. However, the film strip is normally fixed to the spool and needs to be severed therefrom prior to processing. A releasable attachment connects a film strip to a spool. As film strip (40) is modified to include a cut-out portion (44) spaced from aperture (42) which engages a protrusion (20) in slot 18. The releasable attachment is provided by inserting the film strip (40) into the slot (18) until aperture (42) engages with protrusion (20). Subsequent withdrawal of the film strip (40) is achieved by further inserting the film strip (40) into the slot (18) to disengage the aperture (42) from the protrusion (20), and until the cut-out portion (44) clears shoulder portion (24) of the slot (18). At this point, the film strip (40) flips up out of slot (18) and as the film strip is removed in the direction of arrow 'C', shoulder portion (24) supports it so that aperture (42) and protrusion (20) cannot be re-engaged.

2 Claims, 2 Drawing Sheets

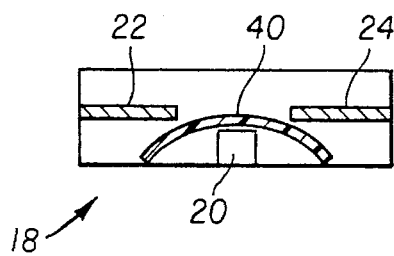
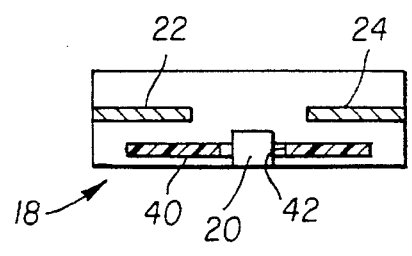
FIG. 4A  FIG. 4B
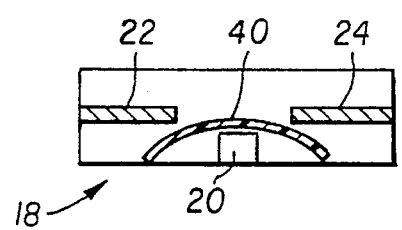
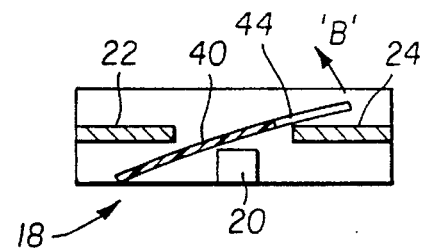
FIG. 4C  FIG. 4D
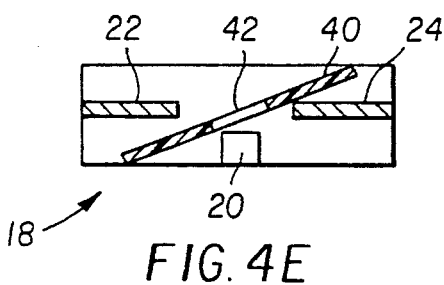
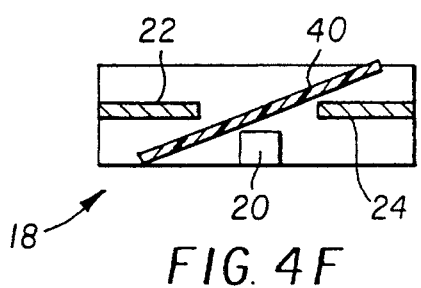
FIG. 4E  FIG. 4F
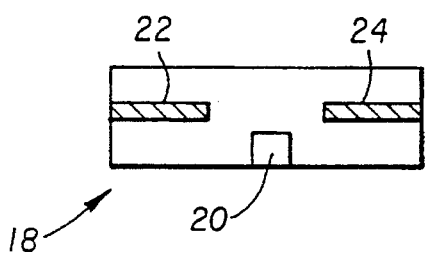
FIG. 4G
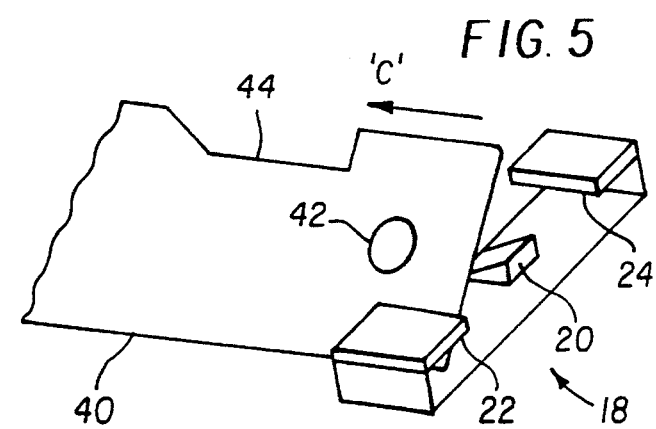
FIG. 5

RELEASABLE ATTACHMENT FOR CONNECTING FILM STRIP TO A FILM CASSETTE

FIELD OF THE INVENTION

The present invention relates to a releasable attachment for connecting a film strip to a film cassette spool, and is particularly concerned with such an attachment which allows for repeated use of the film cassette spool.

BACKGROUND OF THE INVENTION

It is well known to rotatably support a film strip on a spool within a film cassette. In some such arrangements, the end of the film strip adjacent the spool is not secured thereto and there is a risk that the film strip will inadvertently become detached from the spool and hence be wholly withdrawn from the cassette during its exposure. One such arrangement is described in U.S. Pat. No. 4,145,133.

There are other arrangements which overcome this problem by attaching the trailing end of the film strip to the spool. These arrangements prevent the film strip being fully extracted from the cassette during exposure, but necessitate the use of a cutter to detach the film strip from the spool prior to processing.

U.S. Pat. No. 5,054,710 discloses a spool for a camera on to which a film strip is to be wound during exposure. The spool includes a shaft having a slit formed therein. A protrusion is located in the slit to engage a perforation in the leading edge of the film strip, the film strip being wound on to the spool as it is exposed in the camera. When the film strip is fully exposed, it is unwound from this spool back into its cassette. The leading edge of the film strip slips out of the slit as the wall of the perforation engaging the protrusion slides down an angled wall thereof to release the film strip from the spool.

U.S. Pat. No. 4,334,750 discloses an arrangement for a spool in a film cassette which allows the trailing end of the film strip to be released. The arrangement comprises a hollow spool having a slot formed in its wall. A retaining member is located within the hollow spool and carries a protrusion for engaging a perforation in the trailing end of the film strip to retain it in the slot. When it is desired to release the film strip from the spool, the retaining member is pushed inwardly with respect to the spool so that the protrusion is forced out of the slot thereby releasing the perforation and the trailing end. Once pushed in, the retaining member cannot be withdrawn from the spool.

PROBLEM TO BE SOLVED BY THE INVENTION

In arrangements for permanently attaching the film strip to the spool, it is necessary to cut the film strip to detach it from the spool so that it can be processed. This means that a small piece of film strip remains attached to the spool which then has to be removed by hand prior to the spool being re-used.

Although the arrangement described in U.S. Pat. No. 4,334,750 allows the film strip to be detached from the spool without having to sever it therefrom, the spool is complex and cannot be re-used.

SUMMARY OF THE INVENTION

It is therefore an object of the present invention to provide a releasable attachment for connecting a film strip to a film cassette spool which overcomes the problems mentioned above.

In accordance with one aspect of the present invention, there is provided method of releasably attaching a film strip to a film cassette spool, the cassette spool comprising a body portion having a slot formed therein, the slot having retaining means for retaining an end of the film strip, the method comprising the steps of:

a) inserting the end of the film strip in a first direction into the slot in the body portion;

b) engaging the end of the film strip with the retaining means to effect attachment of the film strip to the spool; and c) withdrawing the film strip in a direction which is the reverse to the first direction from the slot to effect detachment of the film strip from the spool;

characterised in that step c) includes the step of:

d) further inserting the end of the film strip into the slot in the first direction to disengage the end of the film strip from the retaining means and partially from the slot prior to withdrawal of the film strip from the slot.

In accordance with another aspect of the present invention, there is provided a film strip for use in the method described above, the film strip having an end which has a cut-out portion provided therein spaced from an aperture which engages with the slot in the body portion of the spool, the cut-out portion allowing partial disengagement from the slot and subsequent withdrawal of the film strip therefrom.

ADVANTAGEOUS EFFECT OF THE INVENTION

The method of the present invention can easily be applied to existing film cassette spools by providing a cut-out portion in the trailing end of the film strip which is to be attached to the spool which is narrower than the width of the slot and allows the film strip to be easily removed therefrom. Existing film cassette spools can be utilised.

BRIEF DESCRIPTION OF THE DRAWINGS

For a better understanding of the present invention, reference will now be made, by way of example only, to the accompanying drawings in which:

FIG. 4 illustrates schematically the steps for attaching the film strip to a spool and subsequent detachment therefrom; and FIG. 5 illustrates detachment of the film strip from its retaining slot in a film cassette spool.

DETAILED DESCRIPTION OF THE INVENTION

In existing arrangements for attaching a trailing end of a film strip to a film cassette spool, the width of the trailing end is no greater than the width of the slot formed in the spool and is preferably substantially the same width. This means that there is engagement between the edges of the trailing end and the walls of the slot. As a consequence, there is little or no lateral movement of the trailing end with respect to the slot. Furthermore, due to the shape of the slot, there is no allowance for any vertical movement of the film strip within the slot except where the film strip engages the slot.

The releasable attachment of the present invention necessitates that there is vertical movement of the trailing end of the film strip within the slot. It is necessary to provide a cut-out portion in the trailing end of the film strip so that a portion thereof is narrower than the slot into which it is to be inserted and that the necessary vertical movement can be achieved. This means that the trailing end of the film strip is not retained at its edges along its entire length and is free to move vertically within the slot when required.

Figure 1:
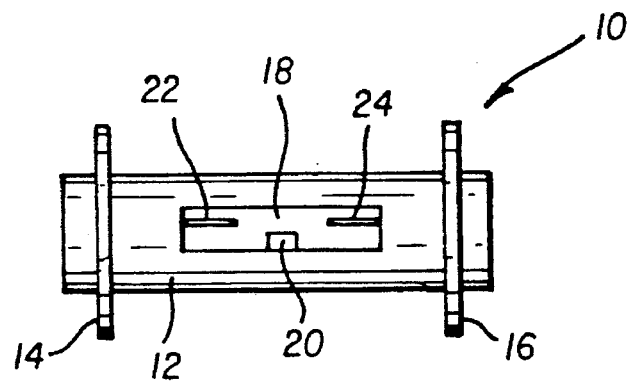
FIG. 1 a schematic side elevation of an existing spool for a film cassette.

FIG. 1 illustrates an existing film cassette spool 10. The spool 10 comprises a body portion 12 which carries two flange members 14, 16 spaced apart along the body portion a distance to accommodate the width of the film strip to be wound thereon. A slot 18 is formed in the body portion 12 for retaining the trailing end of the film strip (not shown). The slot 18 has a central protrusion 20 and two shoulder portions 22, 24 formed one on either side of the protrusion 20. The trailing end of the film strip is inserted over protrusion 20 but under shoulder portions 22, 24.

Figure 2:
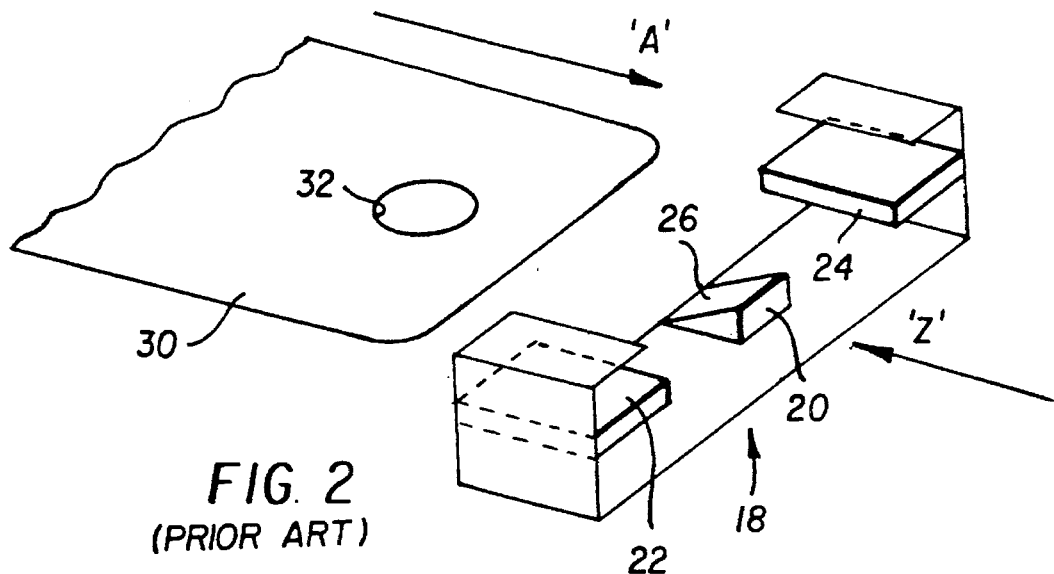
FIG. 2 is a schematic perspective view of a trailing end of a film strip coming into engagement with a slot in spool as shown in FIG. 1 as is conventional.

FIG. 2 illustrates schematically the slot 18 and a trailing end 30 of a film strip. The trailing end 30 has an aperture 32 formed therein for engagement with the protrusion 20 when inserted into the slot 18 in the direction indicated by arrow 'A'. The protrusion 20 has a ramped surface 26 which allows the front edge of the trailing end 30 of the film strip to pass thereover until the aperture 32 falls over the protrusion 20 to effect engagement therewith. Movement of the film strip in a direction reverse to that indicated by arrow 'A' is not possible as is conventional.

Figure 3:
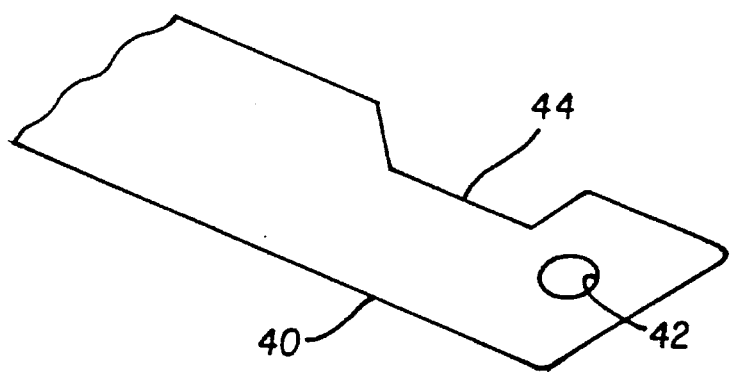
FIG. 3 illustrates a trailing end of a film strip in accordance with the present invention.

FIG. 3 illustrates a trailing end 40 of a film strip in accordance with the present invention. The trailing end 40 has an aperture 42 as is conventional, and a cut-out portion 44 which is spaced from the aperture 42. This cut-out portion 44 allows vertical movement of the film strip within the slot 18.

FIGS. 4A to 4G illustrate the stages of attaching the trailing end 40 of a film strip modified in accordance with the present invention to a film cassette spool and its subsequent detachment therefrom. These stages are illustrated as viewed in the direction of arrow 'Z' in FIG. 2.

In FIG. 4A, the front edge of the trailing end 40 is shown as it is inserted into slot 18 in the direction indicated by arrow 'A' in FIG. 2. Further insertion into the slot 18, as shown in FIG. 4B, brings the aperture 42 of the trailing end 40 into alignment with the protrusion 20 and the film strip is attached to the spool. In this position, withdrawal of the film strip from the slot 18, in the direction reverse to that indicated by arrow 'A' in FIG. 2, is not possible due to the engagement of the protrusion 20 with the aperture 42.

For detachment of the film strip from the spool 10, the trailing end 40 is pushed further into the slot 18 as shown in FIG. 4C. This causes the aperture 42 to pass up over ramped surface 26 of the protrusion 20 so that there is no longer any engagement between the trailing end 40 and the slot 18 of the spool 10. However, if one attempts to withdraw the trailing end 40 of the film strip from the slot 18 (in the direction reverse to arrow 'A' in FIG. 2) at this stage, the aperture 42 will re-engage with protrusion 20.

Further insertion of the trailing end 40 into the slot 18 pushes cut-out portion 44 into the slot 18 between shoulder portions 22, 24. Once the cut-out portion 44 is clear of shoulder portions 22, 24, as shown in FIG. 4D, the trailing end 40 of the film strip flips up out of the slot 18, in the direction of arrow 'B', due to the inherent springiness of the film strip. The film strip is confined in slot 18 by shoulder portions 22, 24 in the shape shown in FIG. 4C. Once the film strip has flipped out, it can be withdrawn from the slot 18, in the direction of arrow 'C' in FIG. 5, as shoulder portion 24 supports the trailing end 40, keeping aperture 42 out of engagement with protrusion 20. This is shown in FIGS. 4E, 4F and 5.

FIG. 4G illustrates the slot 18 with the trailing end 40 of the film strip completely detached therefrom.

We claim:

1. A method of releasably attaching a film strip to a film cassette spool (10), the cassette spool (10) comprising a body portion (12) having a slot (18) formed therein, the slot (18) having retaining means (20) for retaining an end (40) of the film strip, the method comprising the steps of:

a) inserting the end (40) of the film strip in a first direction into the slot (18) in the body portion (12);

b) engaging the end (40) of the film strip with the retaining means (20) to effect attachment of the film strip to the spool (10); and c) withdrawing the film strip in a direction which is the reverse to the first direction from the slot (18) to effect detachment of the film strip from the spool (10);

characterised in that step c) includes the step of:

d) further inserting the end (40) of the film strip into the slot (18) in the first direction to disengage the end (40) of the film strip from the retaining means (20) and partially from the slot (18) prior to withdrawal of the film strip from the slot (18).

2. A film strip for use in the method according to claim 1, the film strip having an end (40) which has a cut-out portion (44) provided therein spaced from an aperture (42) which engages with the slot (18) in the body portion (12) of the spool (10), the cut-out portion (44) allowing partial disengagement from the slot (18) and subsequent withdrawal of the film strip therefrom.

* * * * *